United States Patent [19]

Louie et al.

[11] 4,275,421
[45] Jun. 23, 1981

[54] LCD CONTROLLER

[75] Inventors: Anthony C. H. Louie, San Diego, Calif.; Stephen H. Young, Fairborn, Ohio

[73] Assignee: The United States of America as represented by the Secretary of the Navy, Washington, D.C.

[21] Appl. No.: 15,269

[22] Filed: Feb. 26, 1979

[51] Int. Cl.³ .............................................. H04N 5/22
[52] U.S. Cl. .................................................. 358/183
[58] Field of Search ........................ 358/183, 230, 241

[56] References Cited

U.S. PATENT DOCUMENTS

| 3,862,360 | 1/1975 | Dill et al. ............................. | 358/230 |
| 4,156,237 | 5/1979 | Okada et al. ......................... | 358/183 |
| 4,163,992 | 8/1979 | Inaba et al. .......................... | 358/183 |

Primary Examiner—Richard Murray
Attorney, Agent, or Firm—R. S. Sciascia; Ervin F. Johnston; Thomas Glenn Keough

[57] ABSTRACT

A liquid crystal control unit is programmable to produce appropriate driving waveforms to operate a liquid crystal for displaying an optical image of input information. The input information optionally is from a digital computer or from an electronic camera.

A liquid crystal display (LCD) is actuated to display a portion of or all of an analog television signal or a digital computer originating signal. A conventional television signal is fed through a buffer which in turn couples the signal in parallel to a sync stripper, a video mixer, and a conditioner. From the sync stripper, a phase lock loop creates clock pulses which control horizontal size, sample and position circuitry and vertical size, sample and position circuitry.

The system affords considerable flexibility since the sampling rate and location within the TV picture are displayed on the LCD and can be adjusted by the frequency of the clock pulses originating in the phase lock loop and the size and position of the vertical and horizontal gates. The system affords considerable flexibility since the controller can provide electronic control for LCD any size from 100 by 100, 200 by 200, 400 by 400, etc. By merely expanding the size of the LCD arrays, greater resolution and pictorial information may be conveyed while operation on a sequential or a random access basis is optional.

18 Claims, 20 Drawing Figures

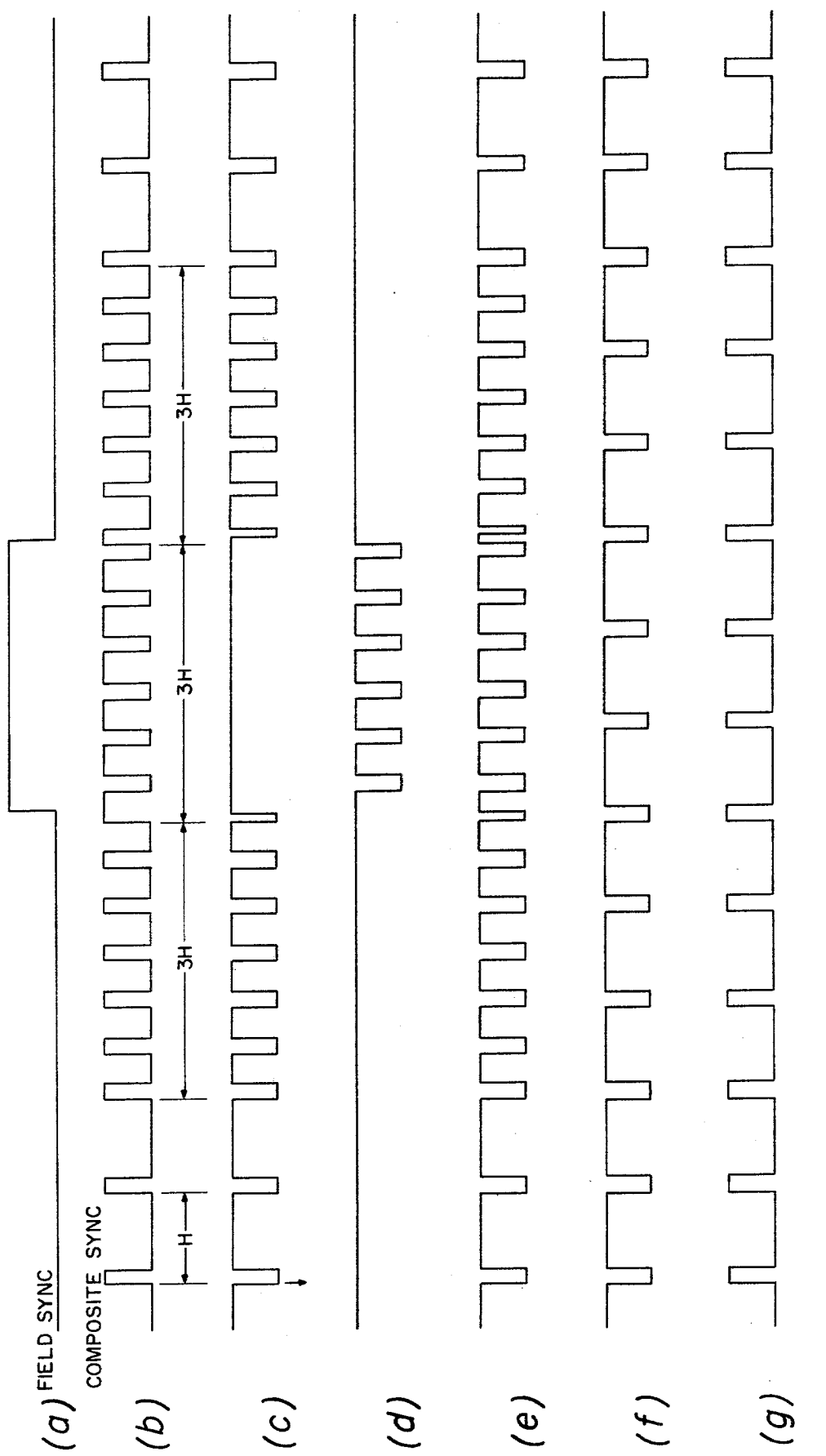
FIG. 4a-g

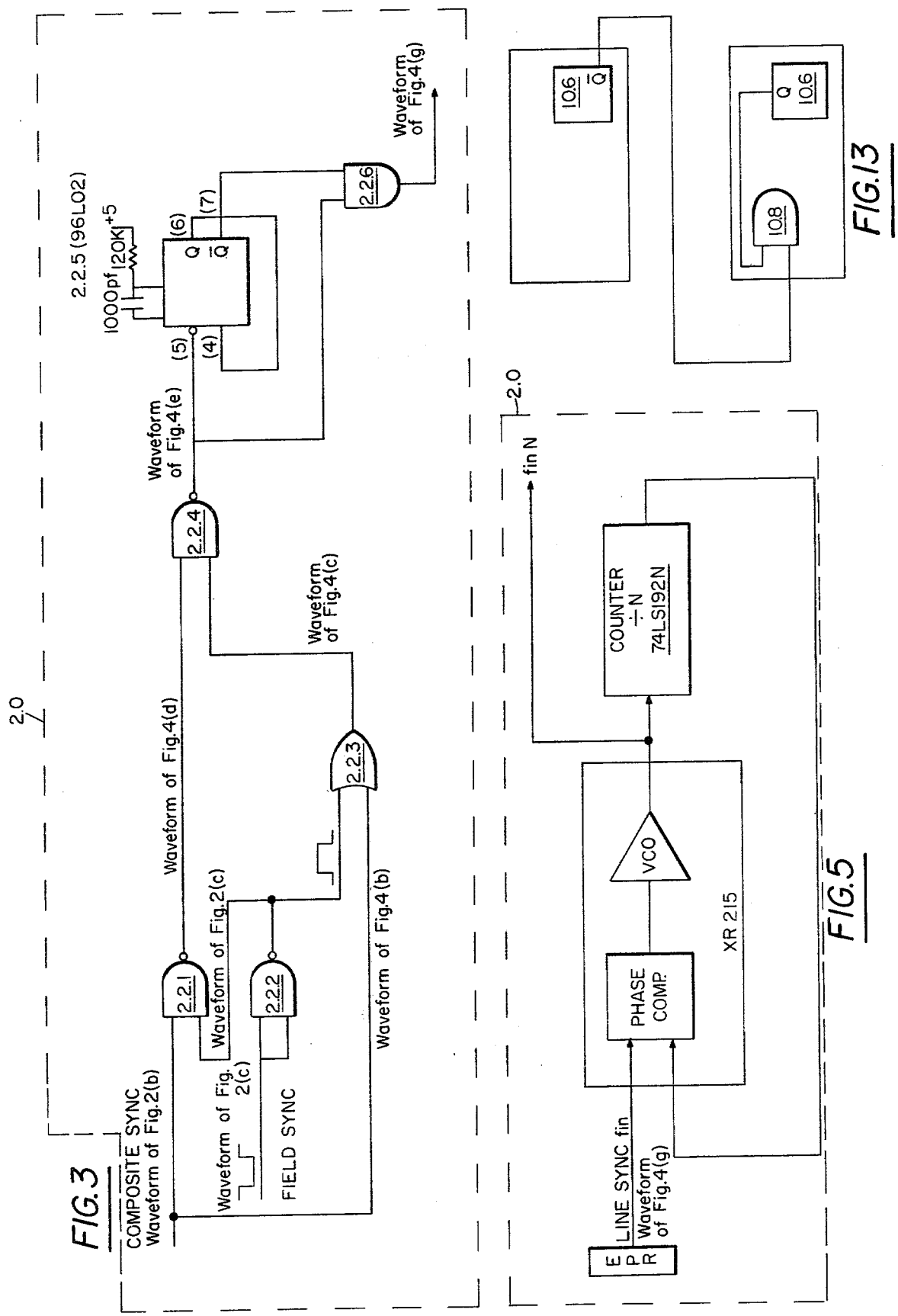

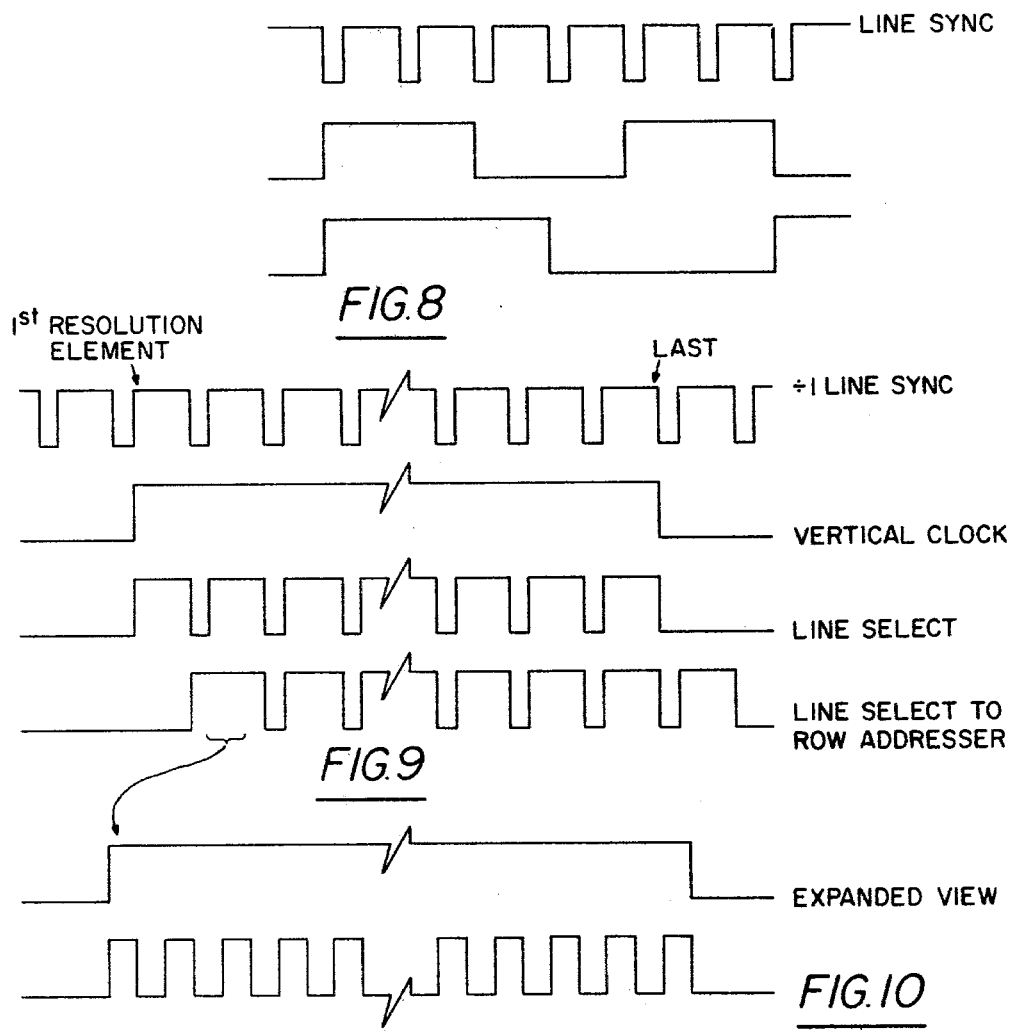
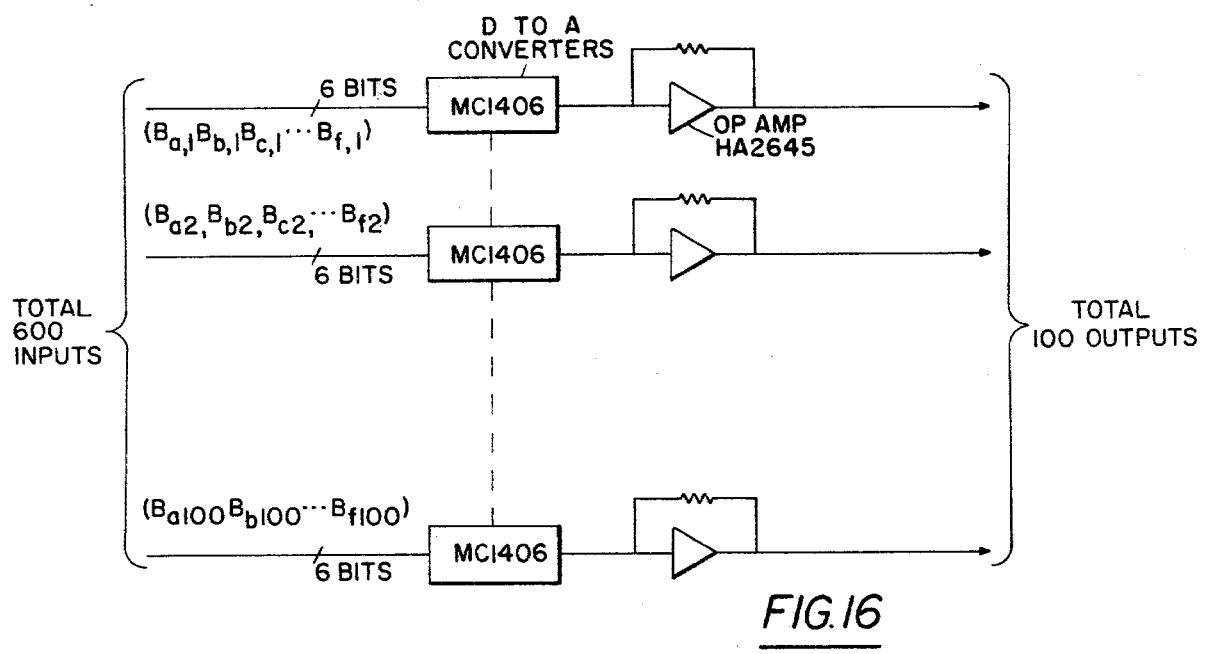

LCD CONTROLLER

BACKGROUND OF THE INVENTION

LCDs are becoming more widely used for the display of television type information. Emerging techniques have made a real time display using LCDs a reality. There are numerous manufacturers of LCDs among which 100 by 100, 200 by 200, 300 by 300, etc. LCD element arrays are routinely marketed in the marketplace by such manufacturers as Hughes and Westinghouse. When the nematic crystals employed are driven in the dynamic scattering mode so that when a cell or element of a LCD is energized to have maximum dynamic scattering, it will reflect the incident light and will appear white to a viewer. One type of Hughes' LCDs are driven in the dynamic scattering mode when approximately a negative 20 volt potential difference with respect to their substrates is applied.

Normally, LCD's are addressed one line at a time. For discussion purposes, a 100 by 100 LCD is assumed. Thus the 100 LCD cells forming a line can be accessed simultaneously. In contrast, a standard TV system is scanned sequentially at only one spot at a time.

Since a conventional 525 line television system scans a line in approximately 63.5μs, the input line containing 100 column values should be stationary for that period. However, because the standard TV format video is transmitted at a 5 mHz rate, some sort of a control unit is needed to convert these signals into appropriate amplitudes for actuating the LCD elements. Simultaneously, a synchronizing line addressing pulse of minus 28 volt amplitude is applied to the address line for the duration of each of the line times so that the dynamic scattering of the individual LCD elements is assured.

The foregoing method of operating an LCD is disclosed in the U.S. Pat. No. 3,862,360. The method and apparatus disclosed in the cited patent is a noteworthy advance in the state-of-the-art and it applies analog techniques to implement dual serial to parallel converters, each of which consists of a set of sample and hold, latch and shift register circuits. The method and apparatus call for the use of 100 such converters for the 100 input columns of the LCD. The shift registers are to provide the sequentially enabling pulses for the sampling operation of the incoming video signal. Each sampled signal is further stored by a latch circuit for the length of a line of TV information. During the storage duration, another converter takes on the job of accepting more incoming data.

However meritorious the method and the system of the patented apparatus are, certain areas for improvement are noted. These can be identified mainly as being in the area of frequency limitation and of the large number of sample and hold circuits. Sample and hold circuitry basically consists of field effect transistor switches and capacitors. Fast sampling requires small capacitor values. Yet, a relatively long storage or hold time demands large values of capacitance. Thus, the relatively high 5 mHz sampling rate and the relatively long 63.5μs storage time are contradictory in terms. Necessarily, there must be a compromise. One alternative is to provide for an arrangement of two sets of sample and hold circuits to satisfy the conflicting requirements of speed versus storage times. A consequence of providing two sets is added cost and, thus, the appeal of this approach is somewhat lost. A further limitation of this approach is that it does not lend itself to interface with digital machines such as computers, microprocessors, etc. with a random access capability. Furthermore, it is generally agreed that it is more difficult to implement analog circuits in the long storage interval form.

Thus, there is a continuous need in the state-of-the-art for a digital electronic system to control the operation of an LCD unit and display the pictorial information coming from either a camera or a computer. These displays also should have the capability of being varied in rate, size, and position as well as being able to be expanded on LCD arrays of various sizes and to be operated on a sequential or random access basis.

SUMMARY OF THE INVENTION

The present invention is directed to providing an apparatus for visually displaying analog television or digital computer originating signals on a display panel having rows and columns of display elements. A means for digitally controlling the selective visually displaying includes a means coupled to receive the television originating signals for extracting vertical and horizontal sync pulses which are fed to a means for generating clock pulses. The clock pulses and certain of the extracted vertical and horizontal sync pulses are fed to a means for determining what portion of the television signals is to be displayed. An analog to digital converter receives the analog television signals and, when it is suitably actuated by the determining means, produces digital television signals while an interfacing means is coupled to receive the digital computer originating signals. An additional means is connected to the digitally controlling means for effecting the selective visual display on a visual display panel. The effecting means includes a switching means coupled to receive the digital television signals and the digital computer originating signals for switching predetermined portions thereof, therethrough. The switched, digital signals are fed to a storing means for storing the digital signals a period of time equal to the time it takes to switch another line of digital signals into the storing means. A digital to analog converter receives the stored digital signals and feeds them to the display panel on a one line at a time basis and a selectively enabling means is connected between the determining means and the display panel for selectively enabling certain rows and columns of the display elements to display the analog form of the switched digital signals.

Therefore, it is a prime object of the invention to provide a circuit to enable the display of the pictorial information originating from a source of analog television signals or digital comuter signals.

Still another object is to provide a circuit which gives an operator the option of choosing the size, position and frequency of a visual display.

Yet another object is to provide a circuit which is compatible with a number of differently sized LCD arrays.

A further object is to provide a display system having the capability for showing the output of a computer.

A further object is to provide a display control circuit that is inherently less complicating than existing designs.

Still another object is to provide a display having a random access capability on a row to row basis on an LCD.

A further object is to provide a display system that avoids the problems otherwise associated with long storage intervals of data.

These and other objects of the invention will become more readily apparent from the ensuing specification when taken with the drawings.

BRIEF DESCRIPTION OF THE DRAWINGS

FIG. 3 shows an equalizing pulse remover disposed on the input side of the phase lock loop.

FIGS. 4a through g depict waveforms in the equalizing pulse remover and in the phase lock loop.

FIG. 5 depicts a block diagram of the phase lock loop that creates the clock pulses for the system of this invention.

FIGS. 8, 9 and 10 depict waveforms within the system.

FIG. 13 sets forth the interconnection of flip-flops between adjoining row addressers to accommodate expanded LCDs.

FIG. 16 depicts the digital to analog converter which feeds analog signals to the LCD.

DESCRIPTION OF THE PREFERRED EMBODIMENTS

Figure 1:
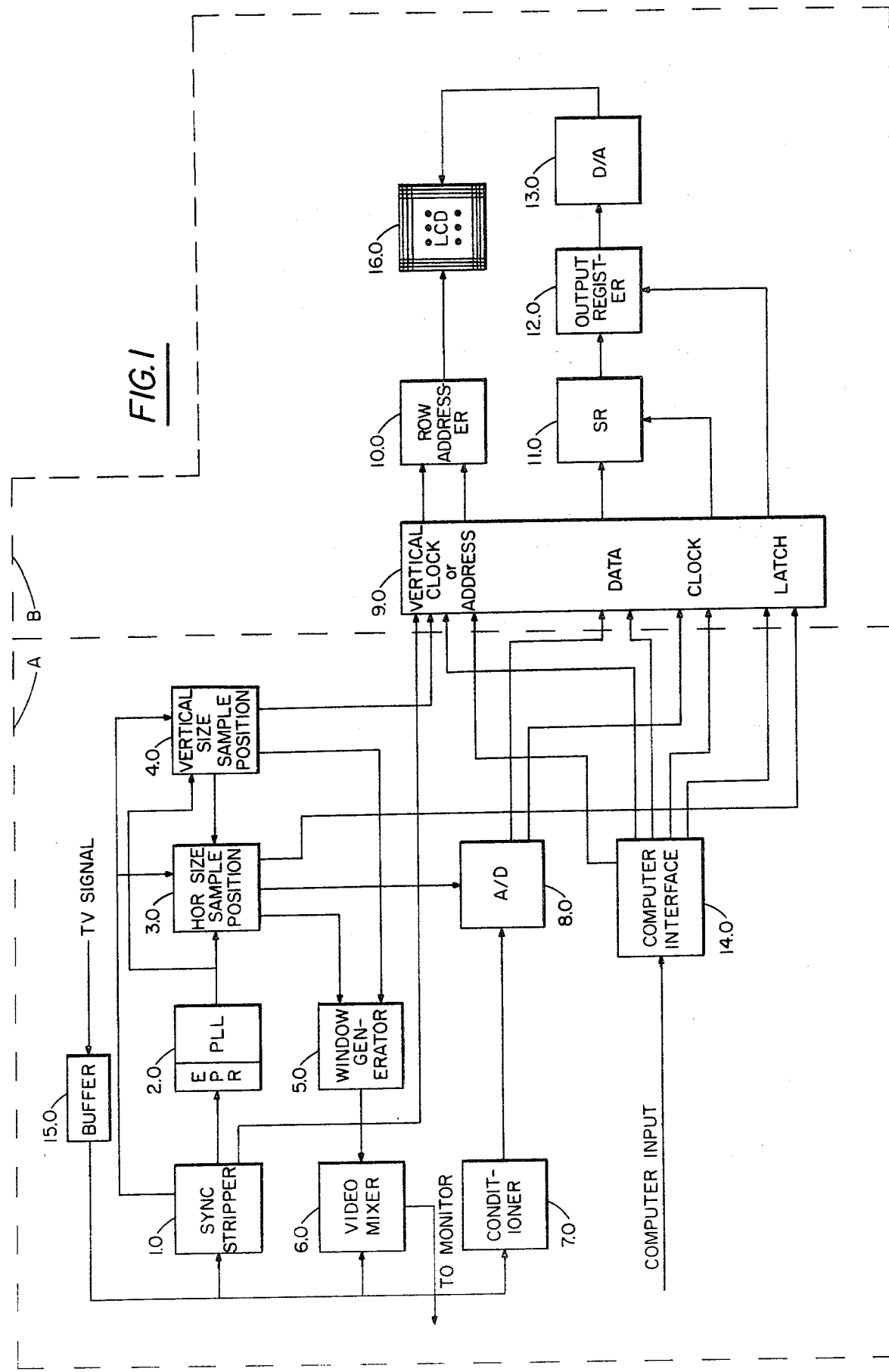
FIG. 1 is a block diagrammatical representation of the LCD control unit optionally receiving analog television signals or digital computer originating signals.

Referring generally to the drawings and in particular to FIG. 1, a control unit for a liquid crystal display (LCD) 16.0 is made up of a controlling section A and an effecting section B. Simply stated, the function of the controlling section is to provide control signals and digital signals representative of analog television signals and the digitized computer information in a form suitable for presentation on the LCD. The effecting section receives the control and digitized signals from the controlling section and effects the display on the LCD in accordance with size, position, and frequency commands originating in the controlling section. These two sections working in concert allow the operation of various sized LCD arrays such as 100 by 100 elements, 200 by 200 elements, etc., and allow the sequential or random access display of information on the LCD.

Figure 2A:
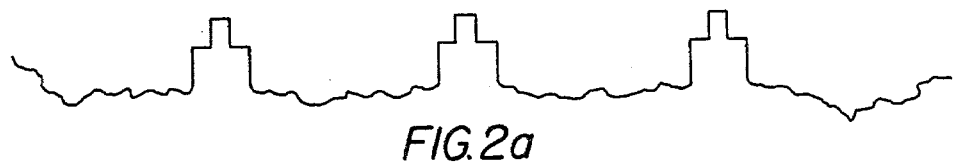
FIGS. 2a, b, c, d, and e depict waveforms as they appear in various parts of the system.

A conventional television signal is shown in FIG. 2(a) and passes through a buffer circuit 15.0 to isolate the receiving equipment from following circuitry. The signals are delivered in parallel to a sync stripper, 1.0, a video mixer 6.0, and a signal conditioner, 7.0.

The sync stripper is a conventional design and is used to extract the composite sync pulses which consist of the vertical (field) sync pulses and the horizontal (line) sync pulses. Its output is nearly identical to that shown in FIG. 2(b). Noting all the waveforms in FIG. 2, in the vertical sync pulse's region, the line sync and equalization pulses are interspersed with the line sync pulses occurring at 15.75 kilohertz with the equalization pulses inserted between them.

Figure 2B:
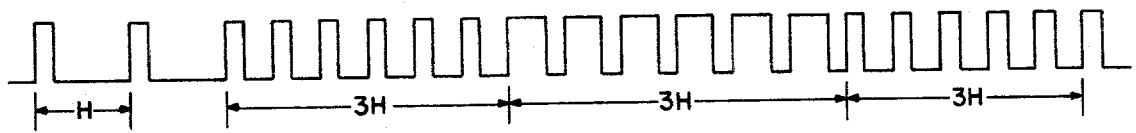
Figure 2C:
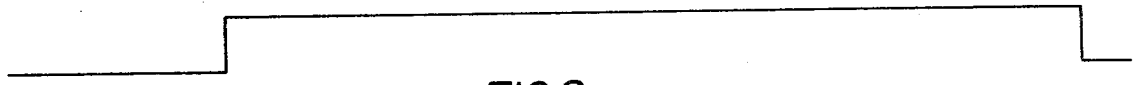
Figure 2D:
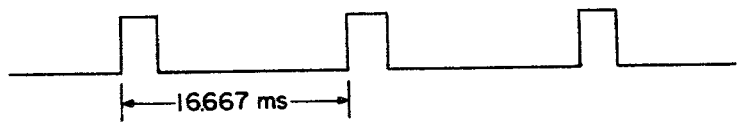
Figure 2E:
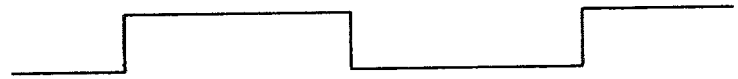

The composite sync pulse of FIG. 2(b) enters the equalizing pulse remover, see FIG. 3, of the phase lock loop (PLL) 2.0. The resulting output waveforms are shown in FIG. 4. The final output, FIG. 4(g), consists of uniformly spaced horizontal sync pulses without the equalization pulses. This is used to synchronize the PLL. If the raw horizontal sync pulses were used as the input to the PLL, the derived clock frequency $f_{in}(N)$ would be out of sync during the vertical sync pulse interval primarily due to the equalization pulses.

Thus, to preserve synchronization for the following circuitry, the circuit of FIG. 3 was designed to remove the equalizing pulses. Within the circuitry depicted in the figure, the waveforms at various stages are shown in FIGS. 4a through g along with elements used to create the stabilized line sync pulse train of FIG. 4(g) which does not have the equalizing pulses.

The incoming composite sync pulses are the inverse of FIG. 4(b). In this figure the high to low transition signifies the beginning of a line. Equalizing pulses are occurring three TV lines in advance and behind the field of sync. During the field sync time interval, note FIG. 4(a), the composite sync is inverted. The equalization pulse remover circuit of FIG. 3 first removes the portion of the waveform depicted in FIG. 4(c) by use of an OR gate 2.2.3 and then adds back the noninverted portion of FIG. 4(d) by a NAND gate 2.2.4, the output of which is an inverse of the waveform of 4(e). Now, the low to high transition is the beginning of the line. The high to low transition is used to trigger a one shot multivibrator 2.2.5 (a 96L02 integrated chip). Its Q output has the duration of approximately three-quarters of a TV line duration. This output is used to inhibit its own retriggering by the equalizing pulses. The output of the one shot multivibrator is applied to AND gate 2.2.6 and together with the inverse signal of FIG. 4(e) produces an output pulse train of line syncs, $f_{in}$, without the equalization pulses which can be used as the input to the remainder of the PLL.

The PLL is used to produce a basic system clock frequency which is N times the input line sync pulse, $f_{in}$. The divided down PLL frequency is compared with the line syncs. Within the PLL depicted in FIG. 5, $f_{in}$ is fed to a phase comparator stage of an XR215 integrated chip which delivers its output to a voltage controlled oscillator stage of the chip. A 74LS192N counter is preset to some value N to determine the highest sampling rate, i.e., system clock rate $f_{in}(N)$. Now that the system clock frequency is preestablished in the PLL section of the system, the signal $f_{in}(N)$ is fed to the horizontal size, sample and position circuitry 3.0 and the vertical size, sample and position circuitry 4.0, both of which determine the size and the position of the data in the composite TV system which is to be shown on LCD 16.0.

Figure 6:
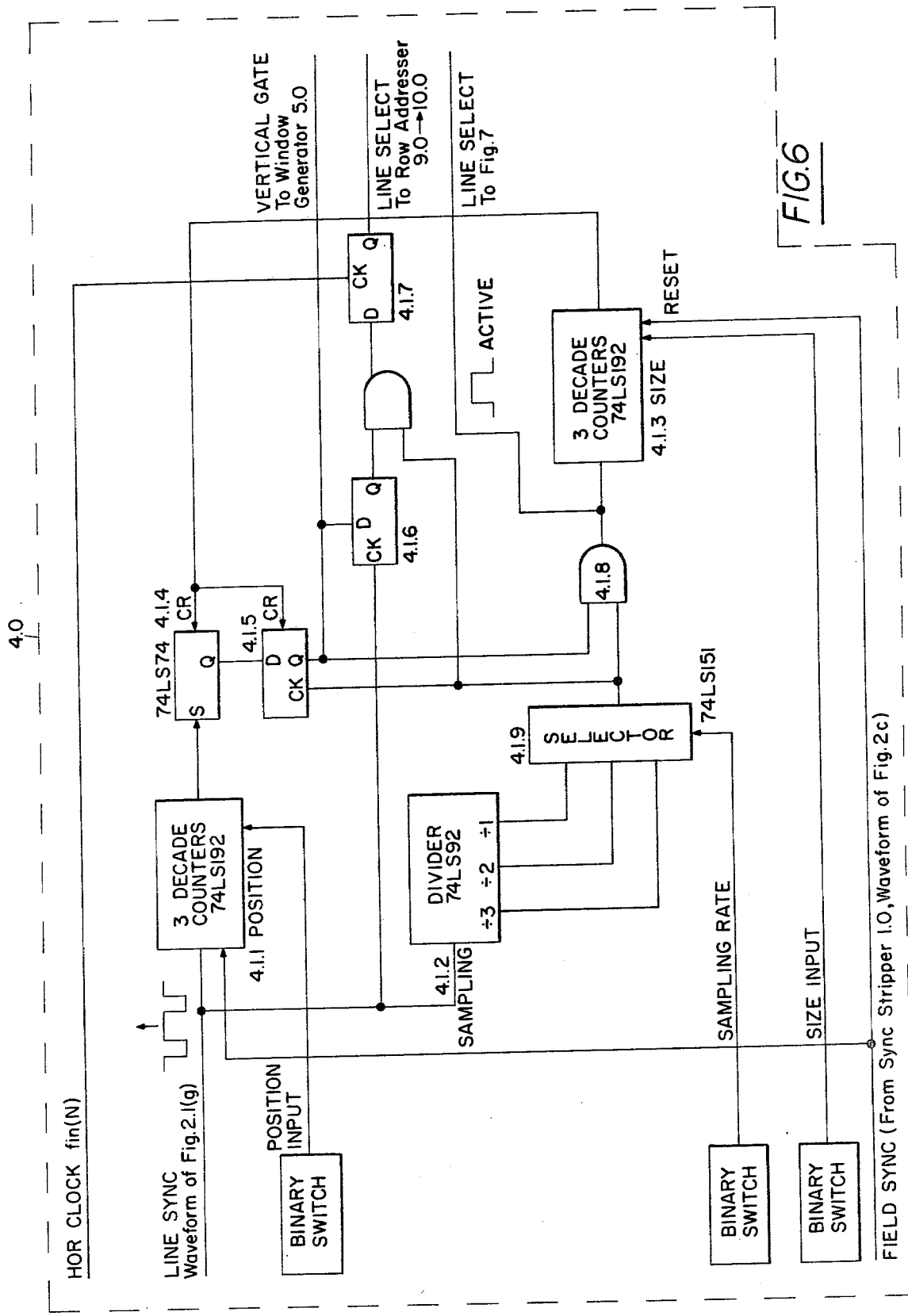
FIG. 6 is a graphic representation of the vertical position, size and sampling control circuitry.
Figure 7:
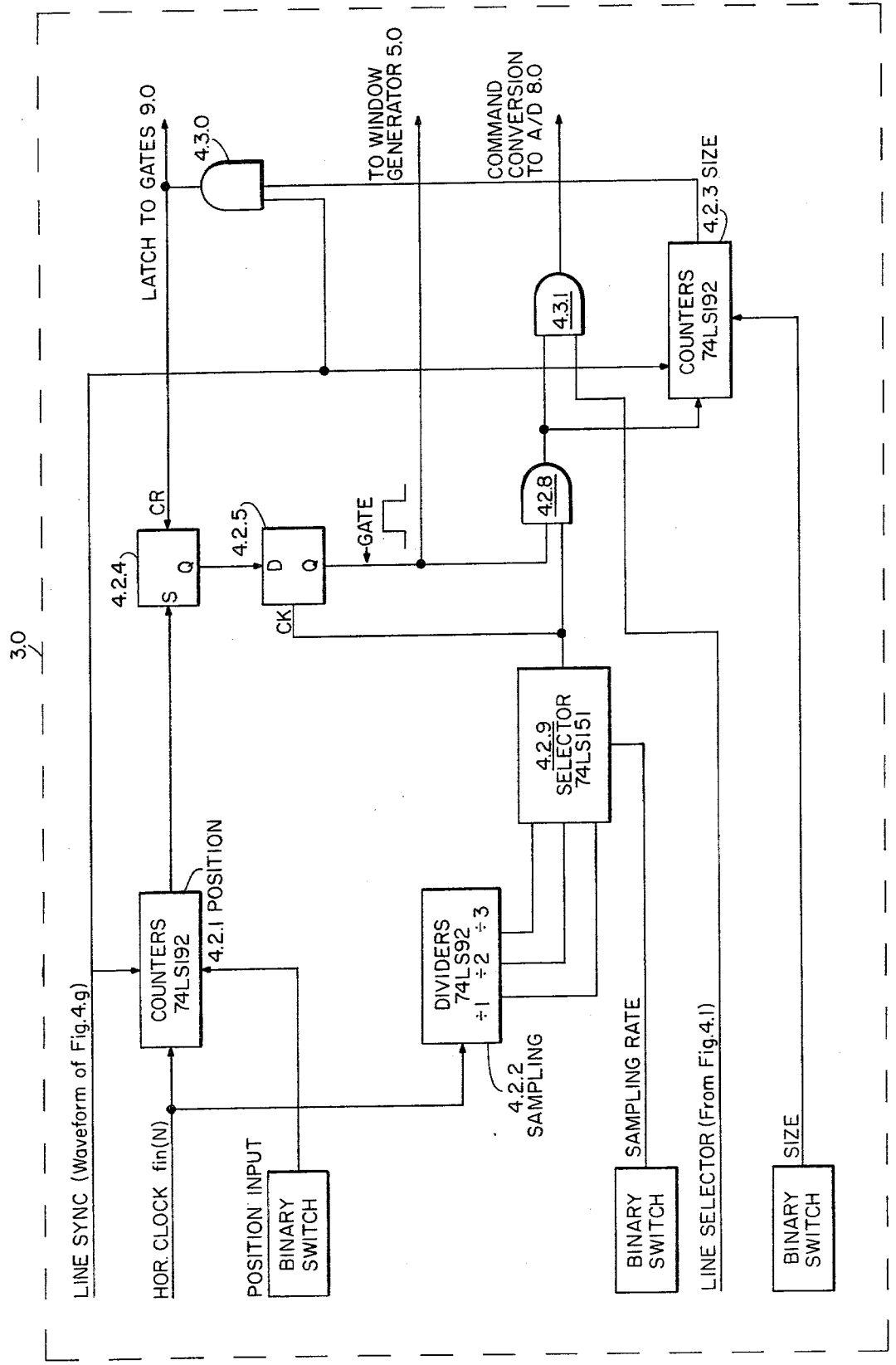
FIG. 7 shows the horizontal position, size and sampling control circuitry.

The system clock pulses generated in the PLL are used to generate the horizontal and vertical timing pulses depicted in FIGS. 6 and 7. As stated before, the circuitries of FIGS. 6 and 7 determine where and how much information is transferred from the incoming video signal to LCD 16.0. Looking to FIG. 7, the horizontal size, sampling and position control circuitry 3.0, receives the line sync (the waveform of FIG. 4g), the horizontal system clock, $f_{in}(N)$, and the line select frequency from the vertical size, sampling and position control circuitry 4.0 of FIG. 6.

As mentioned above, the LCD control unit is designed to transfer all or a selected portion of the picture elements onto the LCD depending upon the sampling rate and size of the LCD array. However, the LCD might consist of 100 by 100, 200 by 200, ... 500 by 500 elements, etc. The two circuitries 3.0 and 4.0 will determine with reference to the picture frame, where, and how many picture elements are transferred to the LCD.

The simplified block diagram of the vertical size, sampling and position control circuitry is shown in FIGS. 6 and has the vertical position determined by the position of a counter 4.1.1. This counter is controlled by a binary switch marketed under the trade designation of Series 23,000 by the Digitran Company of Pasadena, California, and counts up to the preset line numbers (vertical position input) and initiates a set pulse to flip-flop 4.1.4 which opens the vertical gate applied to AND 4.1.8 to allow the line pulse to go through. This line pulse assumes a logical one for the duration of one, two, or three lines, depending upon the sampling rate input.

The divider 4.1.2 provides three output frequencies: divided by 1, 2 or 3 of the line rate. The sampling rate input is generated by a binary switch, also a Series 23,000 manufactured by the Digitran Company of Pasadena, California, and is applied to selector 4.1.9 which selects one of the three frequencies from divider 4.1.2. This selected frequency is gated by gate 4.1.8. After the gate 4.1.8 is opened by the position counter flip-flop 4.1.4, the selected frequency is counted up by counter 4.1.3 once the predetermined number (size input is reached. A reset pulse is sent from 4.1.3 to close the flip-flop 4.1.4. Flip-flop 4.1.5 is used to ensure that the vertical gate and the line select begin just before the first resolution element and end immediately after the last element of the last line. The respective timing relationship among the various signals are shown in FIG. 9.

The line select to row addresser clocks are delayed one line with respect to the line select as the signals pass through flip-flops 4.1.6 and 4.1.7. This delay allows the column value to be ready before a particular row of the LCD is turned on.

The horizontal size, sampling and position control circuitry functions in quite a similar manner. Looking to the circuitry 3.0 as it appears in FIG. 7, a counter 4.2.1 determines the horizontal position timing at which time the conversion command begins and counter 4.2.3 determines the total number of conversion command pulses to be issued per each select line. Both of these counters are controlled by a manually preset binary switch as well as is selector 4.2.9. All three manually preset binary switches are similar to those employed in the vertical size, sampling and position control circuitry and are marketed under the designation Series 23,000 by the Digitran Company of Pasadena, California. The frequency of the conversion command pulses depends upon the sampling control of dividers 4.2.2 and selector 4.2.9. The horizontal circuitry receives signals from sync stripper 1.0, PLL 2.0 and vertical size, sample and position circuitry 4.0 and also functions to provide a window control signal to window generator 5.0 in much the same manner as did the vertical size, sample, and position circuitry. The window generator 5.0 is essentially a pair of one shot multivibrators mixing together to superimpose a dark line outlining the area of the TV picture being sent to the LCD. This outline, or window, is fed to video mixer 6.0 and is shown on an area on a TV monitor.

After being enabled by the line selector signal from the vertical circuitry the horizontal circuitry provides a conversion command to analog to digital converter 8.0. The purpose of the converter is to convert incoming video signals from conditioner 7.0 into digital form. The conversion process is facilitated by the conditioner which adjusts the gain factor as well as the d.c. level of the incoming video signal to within the dynamic range of a specific A/D converter. In this case, the converter is an ABC-BH6B marketed by Datel which can convert a video signal into a 6-bit data word.

Figure 11:
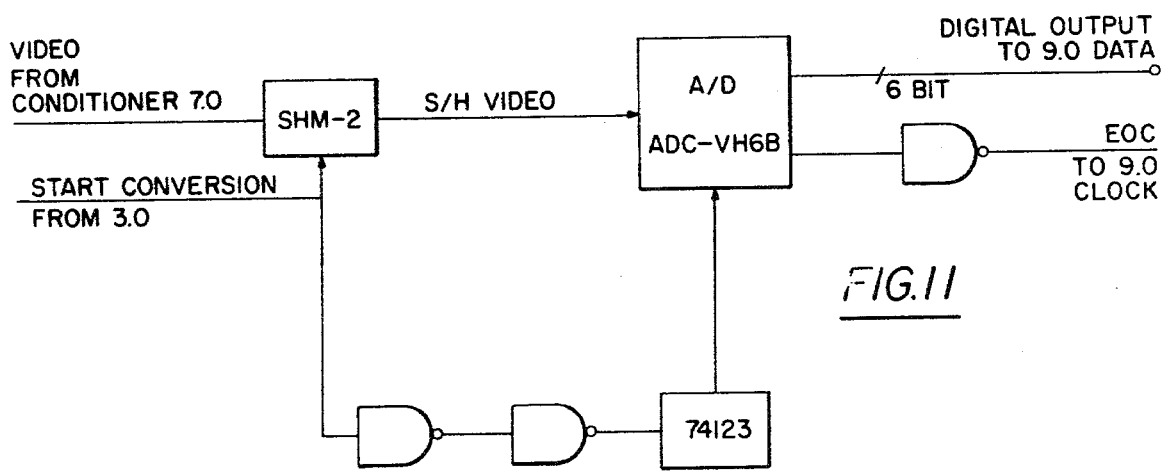
FIG. 11 shows the schematic representation of an analog to digital converter.

Basically, the schematic arrangement of the analog to digital converter is shown in FIG. 11. The incoming video signal from conditioner 7.0 is sampled and held. Then it is applied to the A/D converter the output of which is a 6-bit digital output having values from the most significant bit to the least significant bit. The shm-2 sample and hold integrated amplifier circuit keeps the video stationary during the period of the conversion command. This allows enough time for the A/D conversion to take place. In addition to the 6-bit word data output, an end of conversion (EOC) clock pulse is sent to the serial to parallel register 11.0 via the gating network 9.0.

At this point it should be mentioned that the gating network 9.0 provides a selection of the input either from the TV section or the digital computer. The network basically consists of logical AND, NAND, OR or NOR gates to prevent interference of the controlling section A by effecting section B of the system of this invention. This, of course, reflects only sound electronic design practices to avoid interfering with the various elements forming the controlling section.

Figure 14:
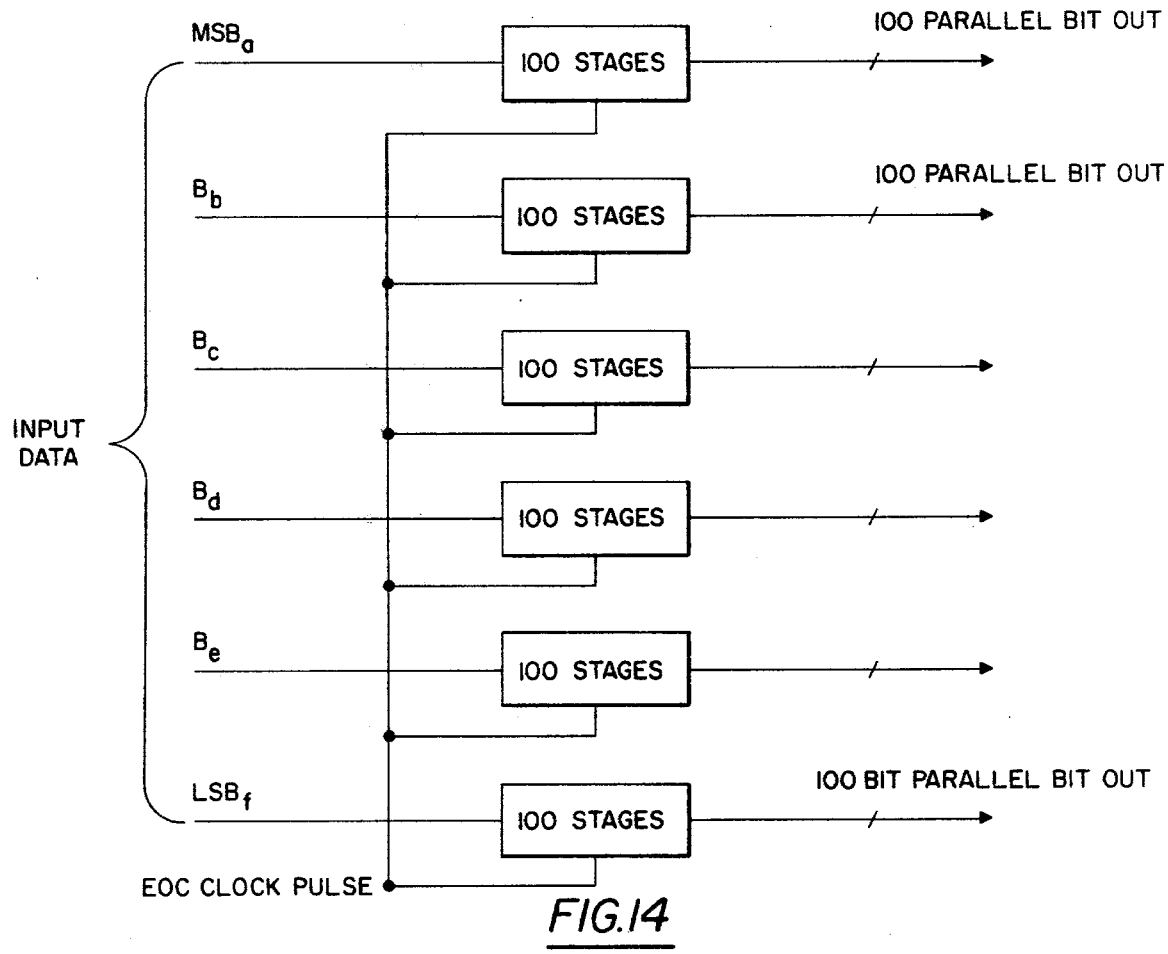
FIG. 14 schematically represents the serial to parallel shift registers.

Looking to FIG. 14, the series to parallel shift registers have 6 100 stage registers arranged to receive the six bit information and each bit is shifted into the register by the end of conversion pulse generated from the A/D. For the purposes of explanation it is assumed that we have a 100 by 100 display element LCD unit 16.0. Therefore, there would be 100 picture elements per line or row. Correspondingly, there would be 100 6-bit words of data and 100 EOC clock pulses would shift this data into the 100 stages of the registers as shown in FIG. 14.

The integrated circuit chip 74LS164N was selected as the basic unit in the serial to parallel registers. Each chip consists of one input and eight parallel outputs.

Figure 15:
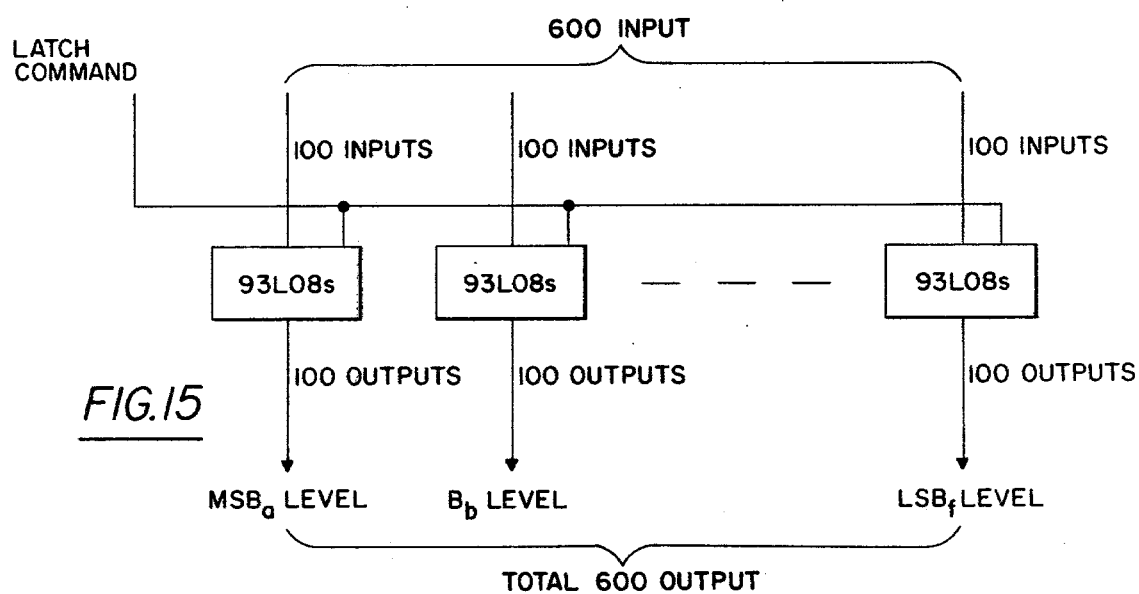
FIG. 15 schematically represents the output registers.

At the end of 100 EOC clock pulses, the 100 outputs of the registers are filled with one line or row of data. Simultaneously, these 100 outputs are transferred to the output holding register 12.0 so that there are 6-bits of data for each of the 100 stages of the serial to parallel output register. This makes the transfer of 600 bits of data available at the output until a new latching command is sent from 3.0, FIG. 7. At that time a new transfer to the output holding registers 12.0 is made. The output registers are schematically depicted in FIG. 15 and have a total of 600 inputs and 600 outputs arranged in each stage from the least significant bit level to the most significant bit level. The output register is fabricated from a number of 93LO8S chips to store the bits representative of the video information.

When the latch command signal from horizontal control circuitry 3.0 is received by output register 12.0 as indicated in FIG. 16, the information contained in the serial to parallel shift registers is loaded into output register 12.0. These in turn hold the 100 6-bit words stationary while shift register 11.0 continues to shift in the bits representing the next TV line.

Usually, the latch commands are 63.5 microseconds apart when the data are sampled on an every TV line basis. The latch command will be twice 63.5 microseconds apart if the sampling is done on every other line. Therefore, the output register outputs remain stationary, a multiple of 63.5 microseconds depending on the vertical sampling rate. This time duration allows adequate time for the digital to analog conversion process to occur in the digital to analog converter 13.0 and the subsequent excitation of LCD 16.0.

The output from the output holding register 12.0 is applied to the input of the D to A converter 13.0. A number of MC1406 chips and serially connected operational amplifiers reduce the 6-bit word signals to representative analog outputs, note FIG. 16. Sequentially the first word associated with the first picture element is applied to the first digital to analog chip. In like manner, the second word is applied to the second digital to analog chip and so forth. The 100 analog output for the digital to analog converter are the 100 column values for LCD 16.0. If the programming of vertical circuitry 4.0 indicates that the analog information is to be displayed, then it enables row addresser 10.0 one line and the analog information is shown on the LCD.

Figure 12:
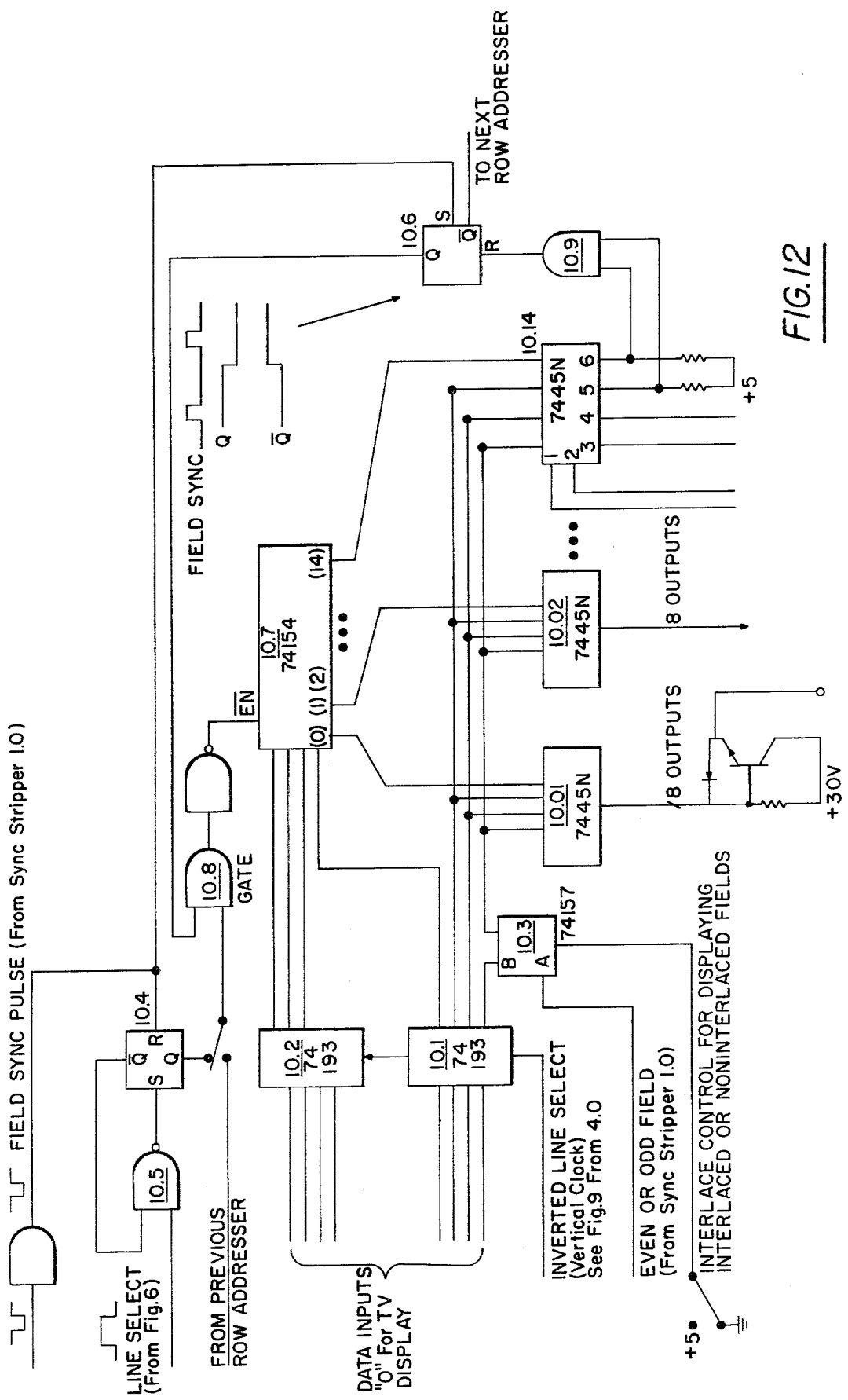
FIG. 12 is a schematic representation of the row addresser.

The row addresser 10.0 as depicted in FIG. 12 of the drawings provides the addressing signals for the display of information on a selected row of the LCD. The sequential addressing capability is provided by the row addresser counter 10.2 and 10.1. The state of the counter advances per each vertical clock. The data inputs to the row addresser counters 10.2, 10.1 are all zero when the LCD is to display video information. A line select signal from the circuit of FIG. 6 enters NAND gate 10.5 and onto flip-flop 10.4. Simultaneously, an inverted line select pulse (a vertical clock pulse) arrives from the vertical size sample circuitry 4.0.

A capability for showing even or odd fields is inherent in the row addresser circuit of FIG. 12. An even or odd field signal from sync stripper 1.0 passes through the gating circuitry 9.0 and to the A input of 10.3. When the interlace control is at plus five volts, the fields are shown interlaced. When it's at ground potential, then only one field is shown. Thus, a display can be made of interlaced or noninterlaced fields on the LCD.

Adjacent row addressers, noting the asterisk on either side of the row addresser of FIG. 12, allow the addresser to be attached to like circuits so that displays in excess of the 100 by 100 display element LCD can be shown. In other words, the row addresser of FIG. 12 is capable of enabling a 100 by 100 LCD. Addressing larger displays e.g., 200 by 200, 300 by 300, etc., merely calls for adding more of the row addressers where indicated in FIG. 12. In this regard the expanded row addressers require that a flip-flop 10.6 of one row addresser be connected to an adjacent row addresser's gate 10.8 in the manner depicted in FIG. 13 of the drawings where the Q output of the flip-flop 10.6 is coupled to gate 10.8. Basically, at the 101 row time gate 10.8 in the second row addresser is enabled. When it reaches 201, it will turn off its own gate 10.8.

Referring once again to the row addresser depicted in FIG. 12, at the beginning of a display cycle, a field pulse is applied to reset flip-flop 10.4 and the gate, 10.8 will be disabled. Simultaneously, it will set flip-flop 10.6 and one side of gate 10.8. As long as the output of 10.8 is low, 74,154 will be disabled. If any one of the inputs to 10.8 is low it will disable 74,154.

Later on, the line select pulses that come in will set the flip-flop 10.4 to high state. Both inputs are high and therefore the 74,154 will be enabled at this time. When the 74,154 is enabled, and the output from counter 10.2 will sequentially actuate one of its outputs will become zero and enable one of the 10.01 to 10.14 7445 decoders. The output of the 7445 decoders and their attached transistor emitters will in turn, one by one, go to zero potential. The effect of all this is that one of the lines on the LCD will be addressed. The synchronization of the enabling pulse from 10.7 and the 10.01–10.14 decoder outputs is provided by the row addresser counters 10.2 and 10.1.

The gates 10.8 and 10.4, and so forth, basically are to ensure that, initially, that no whole line is turned on until the proper time when the line sync enters the register. Then it starts to turn on sequentially.

The outputs from each of the SN7445's are open collector junctions. They are connected to plus 30 volts as shown in FIG. 12, noting the interconnections to circuit 10.01. When the line is not addressed, the specific output is in an off state, the base of the attached transistor is at a plus 30 volt potential and the emitter will be approximately plus 29 volts. When the line is addressed the particular SN745N will turn on a specific line. The base of the transistor is grounded. Consequently, the emitter will be at drive ground potential. Since the substrate of the LCD is set at plus 29 volts, the ground going pulse will appear to be minus 29 volts with respect to the LCD and the LCD will turn on for this line and display the line of information coming from D/A converter 13.0.

There are a total of 14 chips of the SN7445N for addressing 100 lines. They are sequentially enabled by a logical zero from circuit 10.7, a 74,154 chip. It is a logical zero at the most significant bit input to the respective 7445N chips which, in essence, selects the first eight outputs that are being used. When a particular decoder 10.1 . . . 10.14 is enabled, the sequencing is provided by the counters 10.1 and 10.2 each being a 74,193 chip. The counters will advance one state when an inverted line select (counter clock) occurs. The least significant bit to each of the 7445 chips alternatively can be set to a logical one per every other field. This condition is assured by circuit 10.3 when it is appropriately actuated via its two inputs A and B. Thus, the least significant bit input is controlled by the switch 10.3. When noninterlace of even and odd fields is desired the counter output is directly applied to a particular 7445 chip. This results in addressing all lines within a field.

To summarize the operation cycle, a field sync is used to clear the flip-flop 10.4 disabling circuit 10.7, a 74,154 chip. In its disabled state all of its outputs become logical ones and thus no lines will be addressed. When the first line select pulse comes in, it will set flip-flop 10.4 to open its gate through gate 10.8 to enable circuit 10.7 and stop line addressing until flip-flop 10.6 and 10.4 are reset by the next field sync. Hereafter the cycle repeats itself.

Figure 17:
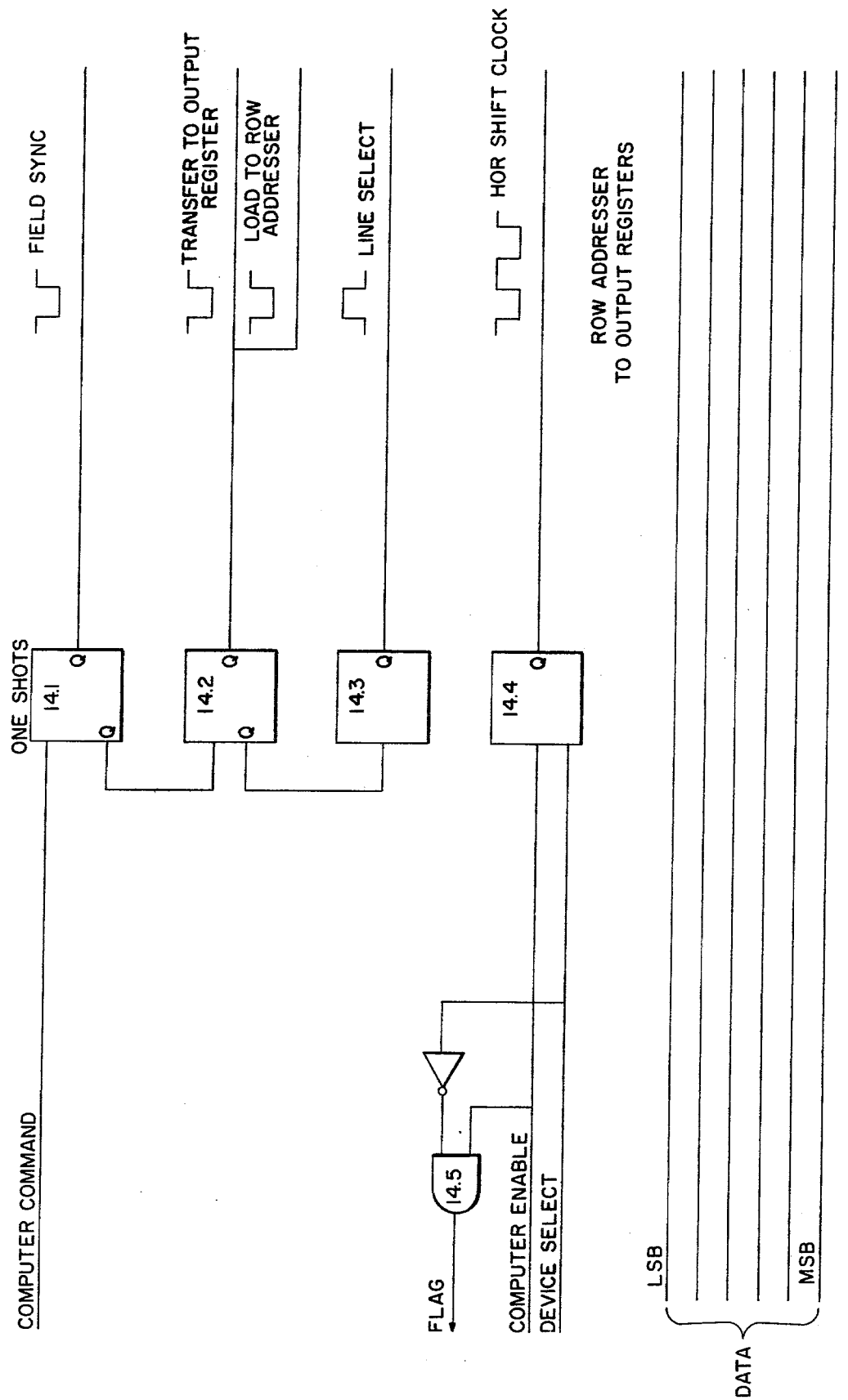
FIG. 17 is the computer interface circuit.

Using the system of this invention with the computer interface 14.0 provides greatly increased capabilities of the system for information can be displayed directly from data stored in a computer. The circuit of the computer interface is shown in FIG. 17 and is illustrative of one method of implementation. Essetially, it provides one field sync to put the row addresser in a nonaddressing mode, it issues shift register clocks to input 100 6-bit words for the 100 column values, it transfers the output from the serial to parallel shift registers to the output registers, it loads the line number into the row addresser and, finally, it provides a line select signal to enable the row addressing.

This particular interface system disclosed in FIG. 17 was designed to work in conjunction with a Hewlett-Packard 9604 measurement and control system. Other systems to be compatible with the system of this invention can be modified to enable the transmission of digital information.

When the LCD controller is selected by a computer select command among its inputs and outputs, a computer signal will be accepted by one shot multivibrator 14.4. The multivibrator generates a shift register clock. Simultaneously, a flag signal is sent back to the Hewlett-Packard 9604 system to acknowledge the execution of this command. As the shift register clock is applied, the data at the input data line are shifted into serial to parallel shift register 11.0. The data lines are shared by the row address input. After 100 shift register clocks have been executed, another computer command generates a sequence of pulses by means of one shot multivibrators 14.1, 14.2 and 14.3. The respective outputs of these multivibrators are field sync pulses, the transfer pulses to the output registers, and the load pulses to the row addressers. As the latter is executed whenever data appears at the input data line, it will be entered into the row address and interpreted as the desired row number is addressed. The last in the sequence of the command will be the line select pulse. It initiates the execution of addressing. The cycle then repeats itself under the control of the Hewlett-Packard 9604 system.

Obviously, many modifications and variations of the present invention are possible in the light of the above teachings. It is therefore to be understood that within the scope of the appended claims the invention may be practiced otherwise than as specifically described.

What is claimed is:

1. An apparatus for selectively visually displaying analog television and digital computer originating signals on a display panel having rows and columns of display elements comprising:
   means for digitally controlling the selective visually displaying including;
     means coupled to receive the television originating signals for extracting vertical and horizontal sync pulses,
     means coupled to the extracting means for generating horizontal element clock pulses,
     means coupled to receive the clock pulses from the generating means for determining what portion of the television signals are to be displayed,
     means coupled to the determining means and to receive the television originating signals for converting at least a portion thereof from analog television signals to serial digital television signals, and
     means coupled to receive the digital computer originating signals for interfacing therewith and
   means connected to the digitally controlling means for effecting the selective visual display on the display panel including;
     means coupled to receive the digital television signals and the digital computer originating signals for switching predetermined portions thereof therethrough,
     means connected to the determining means for storing the switched signals a predetermined time,
     means connected to the storing means for reconverting the switched signals from digital to analog form, and
     means connected between the determining means and the display panel for selectively enabling certain rows at one time of the display elements to display the analog form of the switched signals.

2. An apparatus according to claim 1 further including:
   means coupled to the determining means for generating a window boundary on a remote monitor that is indicative of the visual display on the display panel.

3. An apparatus according to claim 1 in which the selectively enabling means is fabricated to address the display panel on a complete row at a time basis as opposed to a single spot at a time.

4. An apparatus according to claim 3 in which the storing means includes a plurality of serial to parallel shift registers coupled to a like number of output registers responsive to receive the parallel digital signals upon receipt of a latch command signal from the determining means.

5. An apparatus according to claim 4 in which the determining means includes a horizontal size, sample and position circuitry coupled to feed analog video signals to the converting means and to feed latch signals to the storing means and the determining means further includes a vertical size, sample and position circuitry coupled to the horizontal size, sample and position circuitry and the selectively enabling means.

6. An apparatus according to claim 5 in which the storing means includes a serial to parallel shift register connected to an output register both registers are fabricated and interconnected to successively shift digital signals into and out of the shift register and the output register upon the receipt of successive latch pulses from the horizntal size, sample and position circuitry.

7. An apparatus according to claim 6 in which the digital signals are in 6 bit form for conversion to analog form in the reconversion means.

8. An apparatus according to claim 7 in which the generating means is an interconnected equalizing pulse removing circuit coupled to a phase lock loop for generating the clock pulses and the phase lock loop has an adjustable element for varying the rate of the clock pulses.

9. An apparatus according to claim 6 in which the horizontal size, sample, and position circuitry and the vertical size, sample, and position circuitry each include adjustable elements to allow selective variation of the information on the display panel.

10. An apparatus according to claim 1 in which the selectively enabling means is a row addresser responsive to clock pulses from the vertical size, sample, and position circuitry and the interfacing means to address the display panel on a complete row at a time basis.

11. An apparatus according to claim 1 further including:
    means coupled to the converting means for conditioning the received television signal prior to its being converted to digital form.

12. An apparatus according to claim 2 further including:

means coupled to the determining means on a remote TV monitor for mixing the received television signal and the generated window boundary for display on the TV monitor.

13. A method of selectively visually displaying analog television and digital computer originating signals on a display panel having rows and columns of display elements comprising:

controlling the selectively visually displaying including;

extracting vertical and horizontal sync pulses from a received television originating signal, a generating horizontal element clock pulses from the received television originating signals, determining what portion of the television signals are to be displayed in response to the clock pulses, converting at least a portion of the received television originating signals from analog form to digital form and interfacing digital computer originating signals, and effecting the selective visual display on the display panel including;

switching predetermined portions of digital television signals and digital computer originating signals therethrough, storing the switched signals a predetermined time, reconverting the switched signals from digital to analog form, and selectively enabling certain rows at one time of the display elements of the display panel to display the analog form of the switched signals.

14. A method according to claim 13 further including:

generating a window boundary on a remote monitor that is indicative of the visual display on the display panel.

15. A method according to claim 14 further including:

conditioning the received television signal prior to its being converted to digital form.

16. A method according to claim 15 further including:

mixing the received television signal and the generated window boundary for display on a remote TV monitor.

17. A method according to claim 16 in which the step of determining what portion of the television signal is to be displayed includes creating latch and address signals for implementing the storing of switched signals a predetermined time and the selectively enabling of certain rows at one time, respectively.

18. A method according to claim 17 in which the step of storing of the switched signals a predetermined time involves the serial to parallel converting of switched signals and the shifting of the signals between a serial to parallel shift register to an output register.

* * * * *